(12) United States Patent
Kwon et al.

(10) Patent No.: US 11,520,896 B2
(45) Date of Patent: Dec. 6, 2022

(54) STORAGE DEVICE

(71) Applicant: SAMSUNG ELECTRONICS CO., LTD., Suwon-si (KR)

(72) Inventors: Jin Taek Kwon, Seoul (KR); Ye Jin Yoon, Hwaseong-si (KR); Seung-Jae Lee, Hwaseong-si (KR); Ji Soo Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 17/237,532

(22) Filed: Apr. 22, 2021

(65) Prior Publication Data

US 2022/0067166 A1 Mar. 3, 2022

(30) Foreign Application Priority Data

Aug. 25, 2020 (KR) .................. 10-2020-0106697

(51) Int. Cl.
*G06F 21/57* (2013.01)
*G06F 21/64* (2013.01)
*G06F 21/79* (2013.01)

(52) U.S. Cl.
CPC .......... *G06F 21/575* (2013.01); *G06F 21/572* (2013.01); *G06F 21/64* (2013.01); *G06F 21/79* (2013.01); *G06F 2221/0751* (2013.01)

(58) Field of Classification Search
CPC ...... G06F 21/575; G06F 21/572; G06F 21/64; G06F 21/79; G06F 2221/0751
See application file for complete search history.

(56) References Cited

U.S. PATENT DOCUMENTS 7,730,326 B2 6/2010 Girish et al.
8,417,962 B2 4/2013 Novak et al.
(Continued)

FOREIGN PATENT DOCUMENTS

| CN | 108347332 A | * | 7/2018 |
| EP | 3663910 A1 | | 6/2020 |
| KR | 10-2089435 B1 | | 3/2020 |

OTHER PUBLICATIONS

Office Action communication dated Feb. 4, 2022 issued by the European Patent Office in application No. 21192352.9.
(Continued)

*Primary Examiner* — Shin-Hon (Eric) Chen
*Assistant Examiner* — Ethan V Vo
(74) *Attorney, Agent, or Firm* — Sughrue Mion, PLLC

(57) ABSTRACT

A storage device is provided. The storage device includes a boot ROM stores a plurality of public keys and a boot ROM image, an OTP memory identifies a first public key among the plurality of public keys, a first memory including a first area the stores the plurality of public keys and a flash boot image different from the boot ROM image, and a second area that stores a first boot signature corresponding to the flash boot image, a second memory including a first firmware image including a first firmware signature, and a memory controller that receives a second firmware image including a second firmware signature and a second boot signature, receives a second public key among the plurality of public keys and the flash boot image based on the second firmware image being received, and write the second boot signature in the second area of the first memory.

19 Claims, 16 Drawing Sheets

(56) References Cited

U.S. PATENT DOCUMENTS

| | | | |
|---|---|---|---|
| 8,914,627 B2 | 12/2014 | Park et al. | |
| 9,479,332 B2 | 10/2016 | Ballesteros | |
| 9,575,768 B1 * | 2/2017 | Kim | G06F 9/4401 |
| 9,697,359 B2 | 7/2017 | Gantman et al. | |
| 9,798,887 B2 | 10/2017 | Keidar et al. | |
| 9,971,895 B2 | 5/2018 | Rhee et al. | |
| 10,181,956 B2 | 1/2019 | Jeansonne et al. | |
| 10,447,467 B2 | 10/2019 | Brandenburger et al. | |
| 2006/0143600 A1 | 6/2006 | Cottrell et al. | |
| 2007/0038801 A1 * | 2/2007 | Tanaka | G06F 11/1433 |
| | | | 711/103 |
| 2011/0066787 A1 * | 3/2011 | Markey | G06F 21/572 |
| | | | 713/193 |
| 2012/0117365 A1 * | 5/2012 | Navy | G06F 21/572 |
| | | | 713/2 |
| 2012/0210115 A1 * | 8/2012 | Park | H04L 9/3247 |
| | | | 713/2 |
| 2015/0058979 A1 | 2/2015 | Peeters et al. | |
| 2018/0188986 A1 * | 7/2018 | Webster | G06F 21/51 |
| 2019/0278915 A1 * | 9/2019 | Kim | G06F 21/572 |

OTHER PUBLICATIONS

Search Report communication dated Jan. 25, 2022 issued by the European Patent Office in application No. 21192352.9.

* cited by examiner

STORAGE DEVICE

CROSS-REFERENCE TO THE RELATED APPLICATION

This application is based on and claims priority from Korean Patent Application No. 10-2020-0106697 filed on Aug. 25, 2020 in the Korean Intellectual Property Office, and all the benefits accruing therefrom under 35 U.S.C. 119, the contents of which in its entirety are herein incorporated by reference.

BACKGROUND

1. Field

The disclosure relates to a storage device.

2. Description of the Related Art

With diversification of hardware functions of electronic devices, operating systems (OS) have been developed together. However, although the recent operating systems have been implemented to provide various functions and execute various application programs, there is a problem of excessive increase in the capacity required due to complex functions. Accordingly, it takes a lot of time to execute kernel at the same time as booting and execute the operating system.

To solve such a problem, electronic devices such as smart phones, Persona Digital Assistant (PDA) devices, mobile devices, and Internet home appliances have recently used an embedded operating system-based system in which the operating system is stored on a separate chip and equipped in the electronic device instead of reading the operating system from a disk like a desktop computer.

SUMMARY

Aspects of the disclosure provide a storage device.

According to an aspect of the disclosure, there is provided a storage device including: a boot Read Only Memory (ROM) configured to store a plurality of public keys and a boot ROM image; an One-Time Programmable Memory (OTP) memory configured to identify a first public key among the plurality of public keys; a first memory including a first area configured to store the plurality of public keys and a flash boot image different from the boot ROM image, and a second area configured to store a first boot signature corresponding to the flash boot image; a second memory including a user data area, and a firmware image area configured to store a first firmware image including a first firmware signature; and a memory controller configured to: receive a second firmware image including a second firmware signature different from the first firmware signature and a second boot signature different from the first boot signature, receive a second public key among the plurality of public keys and the flash boot image from the first area of the first memory based on the second firmware image being received, and write the second boot signature in the second area of the first memory.

According to another aspect of the disclosure, there is provided a storage device including: a boot Read Only Memory (ROM) configured to store a plurality of public keys and a boot ROM image; an One Time Programmable (OTP) memory configured to identify a first public key among the plurality of public keys; a first memory including a first area configured to store the plurality of public keys and a flash boot image different from the boot ROM image, and a second area configured to store a first boot signature corresponding to the flash boot image, the second area being different from the first area; a second memory including a user data area, and a firmware image area configured to store a first firmware image including a first firmware signature; and a memory controller configured to: receive a second firmware image including a second firmware signature different from the first firmware signature, and write the second firmware image in the firmware image area based on the second firmware image being received, wherein the first area of the first memory is only readable by the memory controller, and the second area of the first memory is readable and writable by the memory controller.

According to another aspect of the disclosure, there is provided a storage device including: a storage device comprising: a boot Read Only Memory (ROM) which stores a plurality of public keys and a boot ROM image; an One-Time Programmable Memory (OTP) memory configured to identify a first public key among the plurality of public keys; a first memory including a first area configured to store the plurality of public keys and a flash boot image different from the boot ROM image, and a second area configured to store a first boot signature corresponding to the flash boot image and different from the first area; a second memory including a user data area, and a firmware image area configured to store a first firmware image including a first firmware signature generated based on a first private key corresponding to the first public key; and a memory controller configured to: receive a second firmware image including a second firmware signature different from the first firmware signature, and a second boot signature different from the first boot signature, write the second boot signature in the second area of the first memory based on the second firmware image being received, and write data in the OTP memory so that the OTP memory identifies a second public key different from the first public key among the plurality of public keys and delete the first boot signature stored in the second area of the first memory, wherein the second firmware signature is generated based on a second private key corresponding to the second public key and the second firmware image.

According to another aspect of the disclosure, there is provided a method including: storing a plurality of public keys and a boot Read Only Memory (ROM) image in a boot ROM; storing the plurality of public keys and a flash boot image different from the boot ROM image in a first area of a first memory; storing a first boot signature corresponding to the flash boot image in a second area of the first memory; storing a first firmware image including a first firmware signature in a second memory; receiving a second firmware image including a second firmware signature different from the first firmware signature and a second boot signature different from the first boot signature; receiving a second public key among the plurality of public keys and the flash boot image from the first area of the first memory based on the second firmware image being received; and writing the second boot signature in the second area of the first memory.

However, aspects of the disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail exemplary embodiments thereof referring to the attached drawings, in which.

DETAILED DESCRIPTION OF THE EMBODIMENTS

Figure 1:
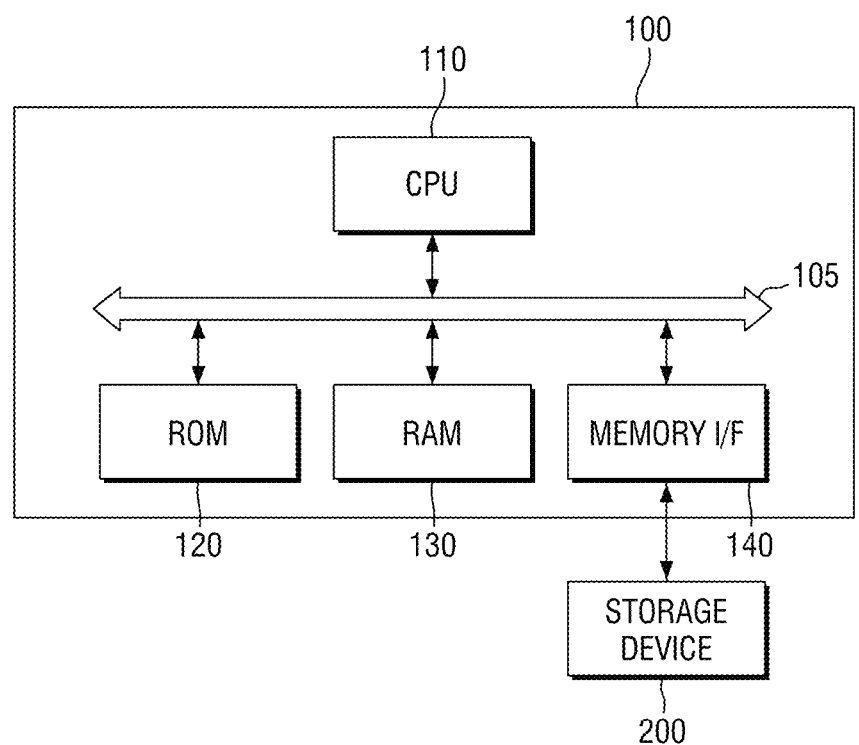
FIG. 1 is a block diagram for explaining a memory system for explaining a semiconductor memory device according to an exemplary embodiment.

FIG. 1 is a block diagram for explaining a memory system for explaining a semiconductor memory device according to an exemplary embodiment.

Referring to FIG. 1, a semiconductor memory system according to an exemplary embodiment includes a host device 100 and a storage device 200.

The host device 100 may send data and commands such as read, write, and erase to the storage device 200. The storage device 200 may read data, write data or erase data in response to the command sent from the host device 100.

The host device 100 may be implemented as a PC (Personal Computer), a laptop computer, a mobile phone, a smartphone, a tablet PC, a PDA (Personal Digital Assistant), an EDA (Enterprise Digital Assistant), a digital camera, a PMP (Portable Multimedia Player), a PND (Portable Navigation Device), MP3 players or an e-book.

The host device 100 may include a central processing unit (CPU) 110, a ROM (Read Only Memory) 120, a RAM (Random Access Memory) 130, and a memory interface 140.

The central processing unit 110 may execute the operating program (OS) which is stored or resides in the ROM 120 or the RAM 130. The central processing unit 110 may execute and control programs stored in the ROM 120, RAM 130 or the storage device 200. The central processing unit 110 may control the overall operation of the host unit 100.

The ROM 120 may store data required to boot up the host device 100. The RAM 130 may be used as a main memory or a cache memory of the host device 100, or may temporarily store the data to be provided to the storage device 200.

The RAM 130 may be, for example, a dynamic random access memory such as a DRAM (dynamic random access memory), an SDRAM (Synchronous DRAM), a DDR SDRAM (Double Data Rate SDRAM), a LPDDR SDRAM (Low Power Double Data Rate SDRAM), a GDDR SDRAM (Graphics Double Data Rate SDRAM), a DDR2 SDRAM, a DDR3 SDRAM and a DDR4 SDRAM or an SRAM. However, the disclosure is not limited thereto, and as such, according to another example embodiment, the RAM may include other memories.

The host device 100 and the storage device 200 may send and receive data through the memory interface 140. The memory interface 140 may be a UFS (Universal Flash Storage), an SCSI (Small Computer System Interface), an SAS (Serial Attached SCSI), an SATA (Serial Advanced Technology Attachment), a PCIe (Peripheral Component Interconnect Express), an eMMC (embedded MultiMediaCard), a FC (Fibre Channel), an ATA (Advanced Technology Attachment), an IDE (Intergrated Drive Electronics), a USB (Universal Serial Bus), an IEEE 1394 (Firewire) and the like. Also, the memory interface 140 may be any interface that allows the host device 100 and storage device 200 to send and receive data. However, the disclosure is not limited thereto, and as such, according to another example embodiment, the memory interface may include other types of interfaces.

The storage device 200 may be a non-volatile data storage medium on which data may be electrically entered and erased. The storage device 200 may be an SSD (Solid State Driver), a memory card (flash memory card), a multimedia card (MMC), a USB flash driver, a smart media, a compact flash, a memory stick, an SD card (secure digital card), a universal flash storage (UFS), and the like. However, the disclosure is not limited thereto, and as such, according to another example embodiment, the storage device may include other types of storage device.

The system bus 105 may make connections between the central processing unit 110, the ROM 120, the RAM, 130 and the memory interface 140.

Figure 2:
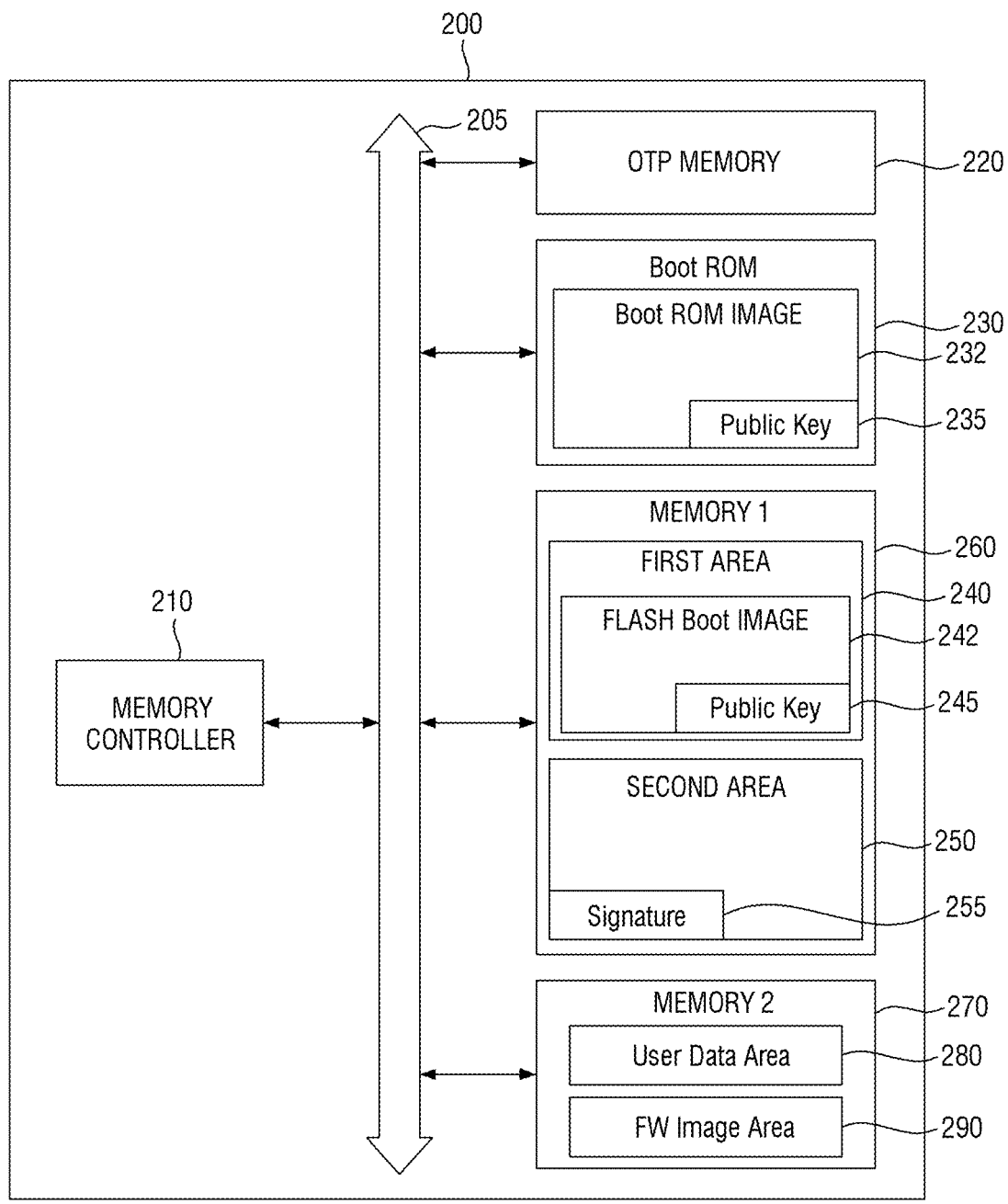
FIG. 2 is a block diagram for explaining a storage device of FIG. 1.

FIG. 2 is a block diagram for explaining the storage device of FIG. 1.

Referring to FIG. 2, the storage device 200 according to an exemplary embodiment may include a system bus 205, a memory controller 210, an OTP memory 220, a boot ROM 230, a first memory (MEMORY 1) 260 and a second memory (MEMORY 2) 270.

The memory controller 210 may control the overall operations of the OTP memory 220, the boot ROM 230, the first memory 260 and the second memory 270. For example, the memory controller 210 may receive data, addresses, and commands from the host device 100 and control the operation of the second memory 270 in response to them.

An OTP memory (One-Time Programmable Memory) 220 may identify a public key used at the time of booting. For example, the OTP memory 220 may identify one of a plurality of public keys 235 stored in the boot ROM 230. The OTP memory 220 may identify one of a plurality of public keys stored in a first area 240 of the first memory 260. That is, the OTP memory 220 may identify an address of the public keys 235 and 245. The memory controller 210 may boot up the storage device 200, using the public keys 235 and 245 identify by the OTP memory 220.

The boot ROM 230 may include a boot ROM image 232. The boot ROM image 232 may include a boot code executed when the storage device 200 is booted up. The boot ROM image 232 may include a plurality of public keys 235. The public keys 235 may be injected into the boot ROM image 232 in the manufacturing (or fabrication) process of the storage device 200.

The first memory 260 may include a boot code that is executed after the boot ROM 230 is executed when the storage device 200 is booted up. Therefore, the first memory 260 may be a memory in which an access is restricted by the host (100 of FIG. 1). That is, the first memory 260 may not be an area in which data is written or read by the host.

The first memory 260 may include a first area 240 and a second area 250.

A flash boot image 242 different from the boot ROM image 232 may be stored in the first area 240. The flash boot image 242 may include a boot code that is executed when the storage device 200 is booted up. The first area 240 may be an area that is only readable by the memory controller 210 but is not writable. That is, according to an example embodiment, the memory controller 210 cannot write in the first area 240.

The flash boot image 242 may include a plurality of public keys 245. A plurality of public keys 245 may be injected into the flash boot image 252 in the manufacturing process of the storage device 200.

The second area 250 may store a boot signature 255 on the flash boot image 252. That is, in the first memory 260 according to an exemplary embodiment, the first area 240 in which the flash boot image 252 is stored may be separated from the second area 255 in which the boot signature 255 is stored.

The boot signature 255 may be generated, for example, using one public key of the flash boot image 242 and the plurality of public keys 245. The boot signature 255 may be stored in the second area 250 together with the flash boot image 242 of the first area 240 when the storage device 200 is fabricated. Further, the boot signature 255 may be written by the memory controller 210 in the update process of the storage device 200. That is, the second area 250 may be an area that is readable and writable by the memory controller 210.

The first memory 260 may include a non-volatile memory. The first memory 260 may be, for example, a NOR flash memory.

The second memory 270 may include a user data area 280 and a firmware (FW) image area 290.

The user data area 280 may be an area that may be accessed by the host. For example, the user data area 280 may be an area in which data is written and read by the memory controller 210 in accordance with commands such as read or write provided from the host. That is, the user data area 280 may be most of the area in which the data is written and stored in the second memory 270.

In contrast, the firmware image area 290 may be an area in which an access of the host is restricted. The firmware image may be stored in the firmware image area 290. The firmware image may include a boot code that is executed when the firmware 215 of the memory controller 210 is booted up. The firmware image may be stored in the firmware image area 290 in the manufacturing process of the storage device 200. According to another example embodi-ment, a new firmware image may be stored in the firmware image area 290 by the firmware update after release of the storage device 200.

The second memory 270 may include a non-volatile memory. The second memory 270 may include, for example, a NAND flash memory, a vertical type NAND flash memory (Vertical NAND: VNAND, 3D), a NOR flash memory, a PRAM (Phase-Change Random Access Memory), a RRAM (Resistive Random Access Memory), a MRAM (Magne-toresistive Random Access Memory), a FRAM (Ferroelec-tric Random Access Memory), an STT-RAM (Spin Transfer Torque Random Access Memory), a non-volatile memory device similar to this or the like. However, the disclosure is not limited thereto, and as such, according to another example embodiment, the second memory may include other types of memory.

The OTP memory 220, the boot ROM 230, the first memory 260, and the firmware image area 290 of the second memory 270 are spaces in which information used for booting up the storage device 200 and the boot code are stored, and may be areas which may not be arbitrarily changed by the host and in which security is maintained. Hereinafter, a detailed explained will be provided referring to FIG. 3.

The system bus 205 may perform connections between the memory controller 210, the OTP memory 220, the boot ROM 230, the first memory 260 and the second memory 270.

Figure 3:
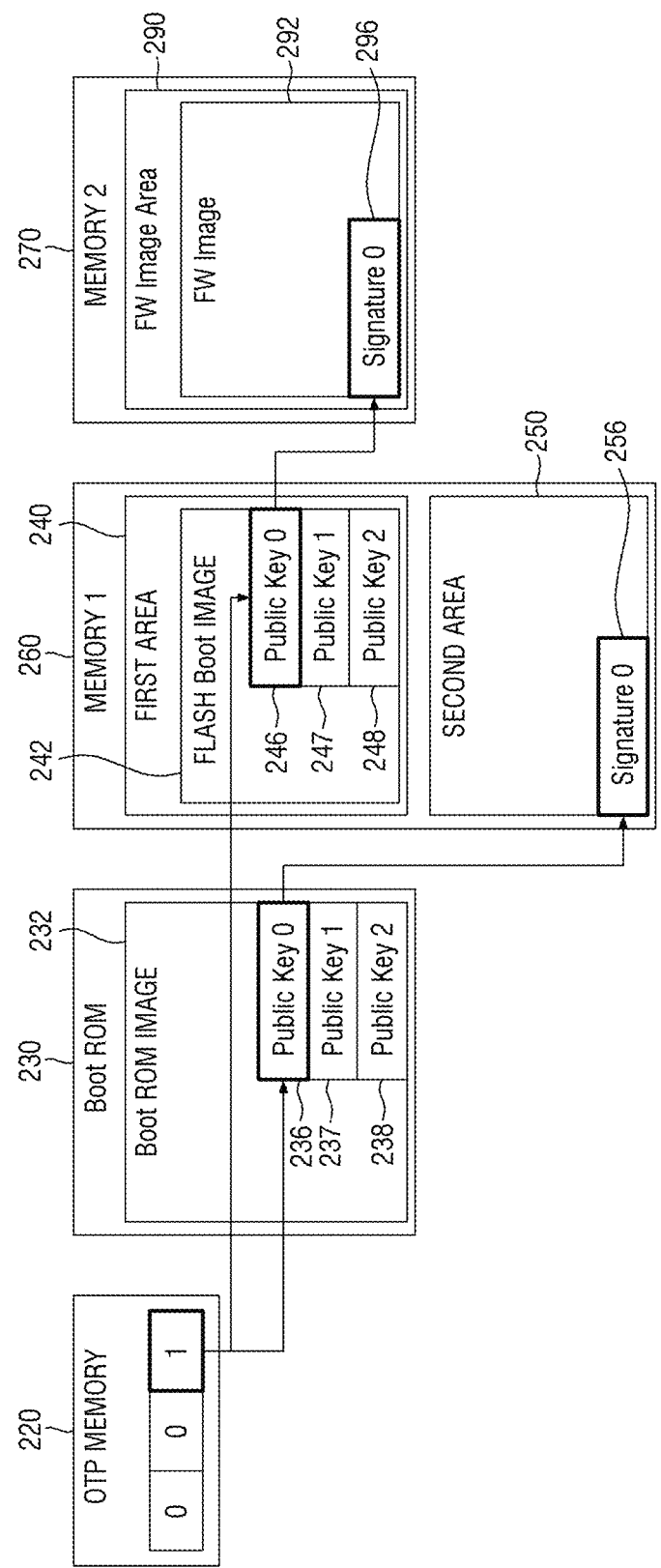
FIG. 3 is a diagram for explaining a booting process of the storage device of FIG. 2.

FIG. 3 is a diagram for explaining the booting process of the storage device of FIG. 2.

Referring to FIGS. 2 and 3, the boot ROM 230 may be copied to the memory controller 210 when a power is applied to the storage device 200. The copied boot ROM image 232 may be executed by the memory controller 210. As a result, the memory controller 210 may be changed to the core of the boot ROM 230.

Subsequently, the first memory 260 may be copied to the memory controller 210. The memory controller 210 may verify the copied flash boot image 242. The memory con-troller 210 may read the written data of the OTP memory 220. The memory controller 210 may verify the boot sig-nature 256 of the flash boot image 242, using the first public key 236 in the boot ROM image 232, based on the write data of the OTP memory 220. For example, the memory con-troller 210 may verify the boot signature 256 of the flash boot image 242 using the first public key 236 identified by the OTP memory 220. The first public key 236 may be a value for confirming that the flash boot image 242 is created in an authenticated place.

When the boot signature 256 of the flash boot image 242 is verified, the flash boot image 242 may be executed by the memory controller 210. As a result, the memory controller 210 may be changed to the core of the second memory 270.

Subsequently, the firmware image 292 may be copied from the firmware image area 290 of the second memory 270 to the memory controller 210. The firmware image 292 may include a firmware signature 296. The firmware signa-ture 296 may be generated, using the firmware image 292 and a manufacturer's private key. The firmware signature 296 may be stored in the firmware image area 290 along with the firmware image 292 when manufacturing the stor-age device 200.

The memory controller 210 may verify the copied firm-ware image 292. The memory controller 210 may verify the firmware signature 296 of the firmware image 292, using the first public key 246 in the first memory 260, based on the data written in the OTP memory 220. This makes it possible to confirm that the firmware image 292 is created in an authenticated place.

Each address of the public keys 236, 237 and 238 stored in the boot ROM image 232 may correspond to each address of the public keys 246, 247 and 248 stored in the flash boot image 242. For example, an address at which the first public key 236 is stored in the boot ROM image 232 may correspond to an address at which the first public key 246 is stored in the flash boot image 242. This is because a plurality of public keys 236, 237 and 238 stored in the boot ROM image 232, and a plurality of public keys 246, 247 and 248 stored in the flash boot image 242 are used when booting up based on the data written on the OTP memory 220. Thus, verification of the flash boot image 242 and verification of the firmware signature 296 may be performed by the same public key.

When the firmware signature 296 of the firmware image 192 is verified, the firmware image 292 may be executed by the memory controller 210. As a result, the memory controller 210 may be changed to the core of the firmware. That is, the memory controller 210 may be operated by the firmware.

Accordingly, the storage device 200 may be booted up for security. After that, the storage device 200 may be driven by the firmware.

Figure 4:
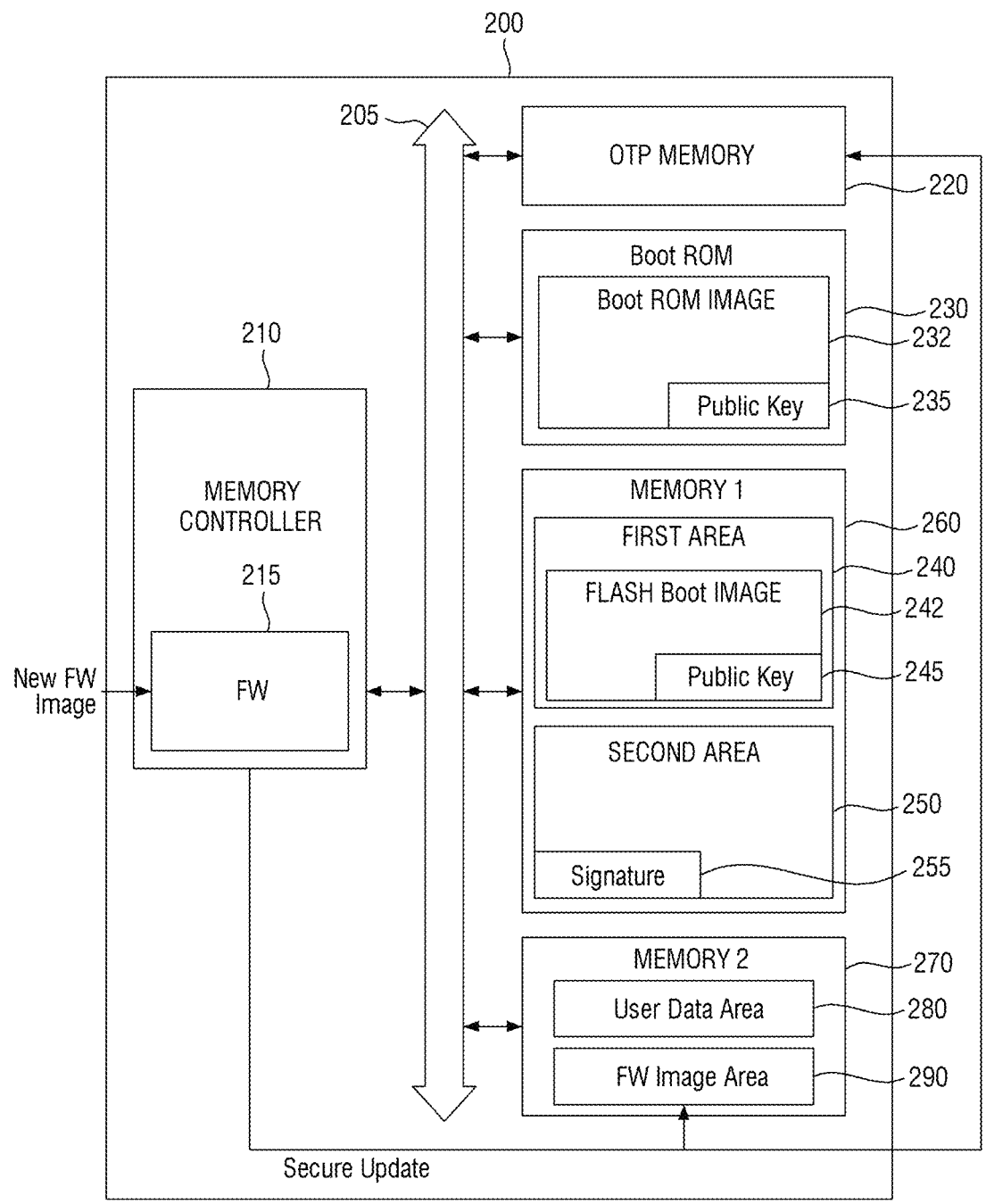
FIG. 4 is a block diagram for explaining an update method of the storage device according to an exemplary embodiment.

FIG. 4 is a block diagram for explaining an update method of the storage device according to an exemplary embodiment.

Referring to FIG. 4, the storage device 200 may execute a secure update of the firmware image area 290 of the second memory 270 according to an example embodiment. The secure update may be executed in a state in which the storage device 200 is booted up. That is, the memory controller 210 may be in a state of being driven by the firmware 215. The secure update may also be performed by the firmware 215.

The storage device 200 may be provided with a new firmware image from the outside. The firmware 215 may write the new firmware image in the firmware image area 290 of the second memory 270 in response to provision of the new firmware image, and may write a new boot signature 255 in the second area 250 of the first memory 260. Also, the firmware 215 may provide a public key write command to the OTP memory 220 in response to the provision of the new firmware image. The OTP memory 220 may identify another public key in response to the public key write command. Hereinafter, a detailed explained will be given referring to FIGS. 5 to 9.

Figure 5:
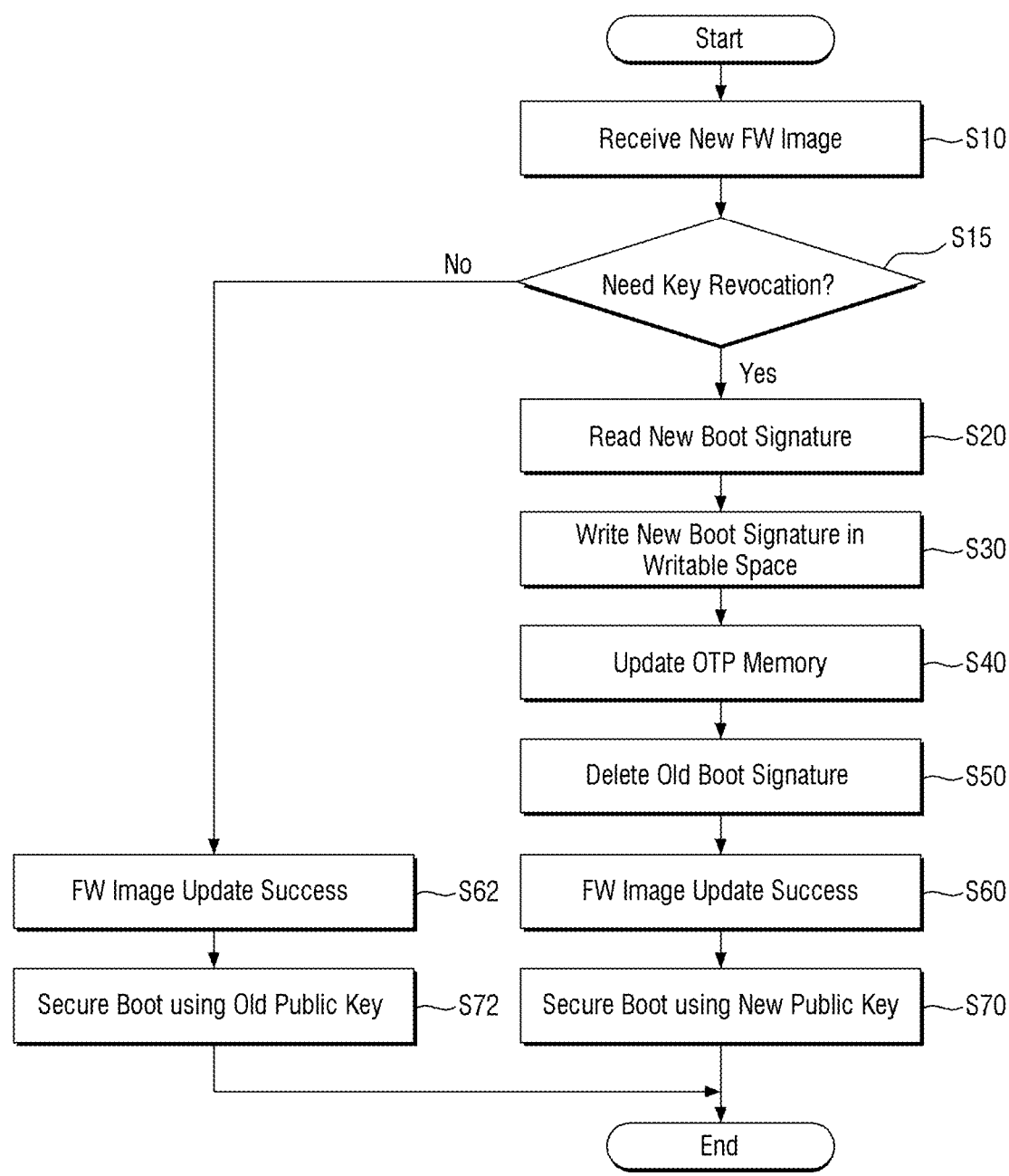
FIG. 5 is a flowchart for explaining the update method of the storage device according to an exemplary embodiment.
Figure 6:
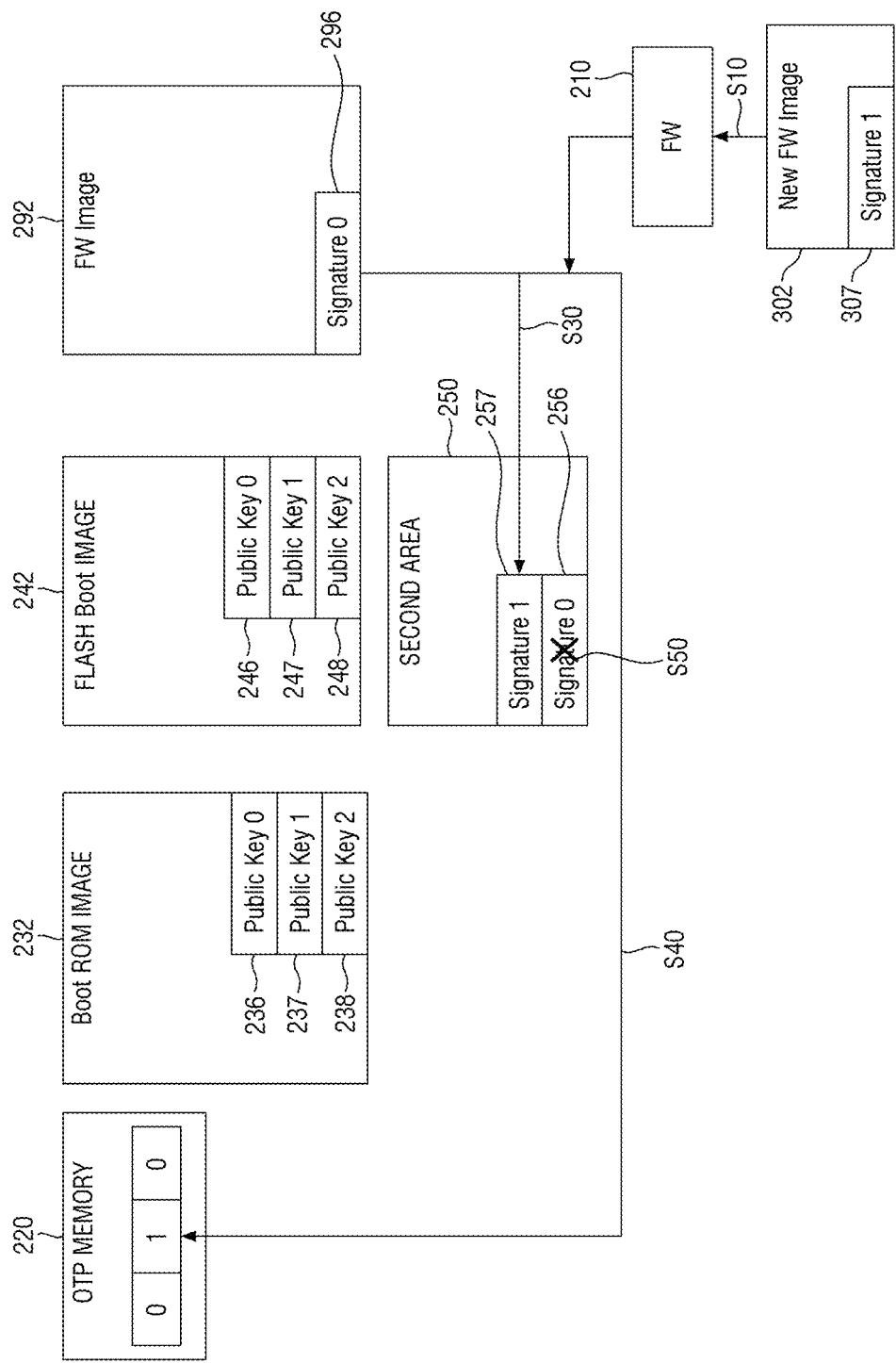
FIG. 6 is a block diagram for explaining the update method of the storage device according to FIG. 5.
Figure 7:
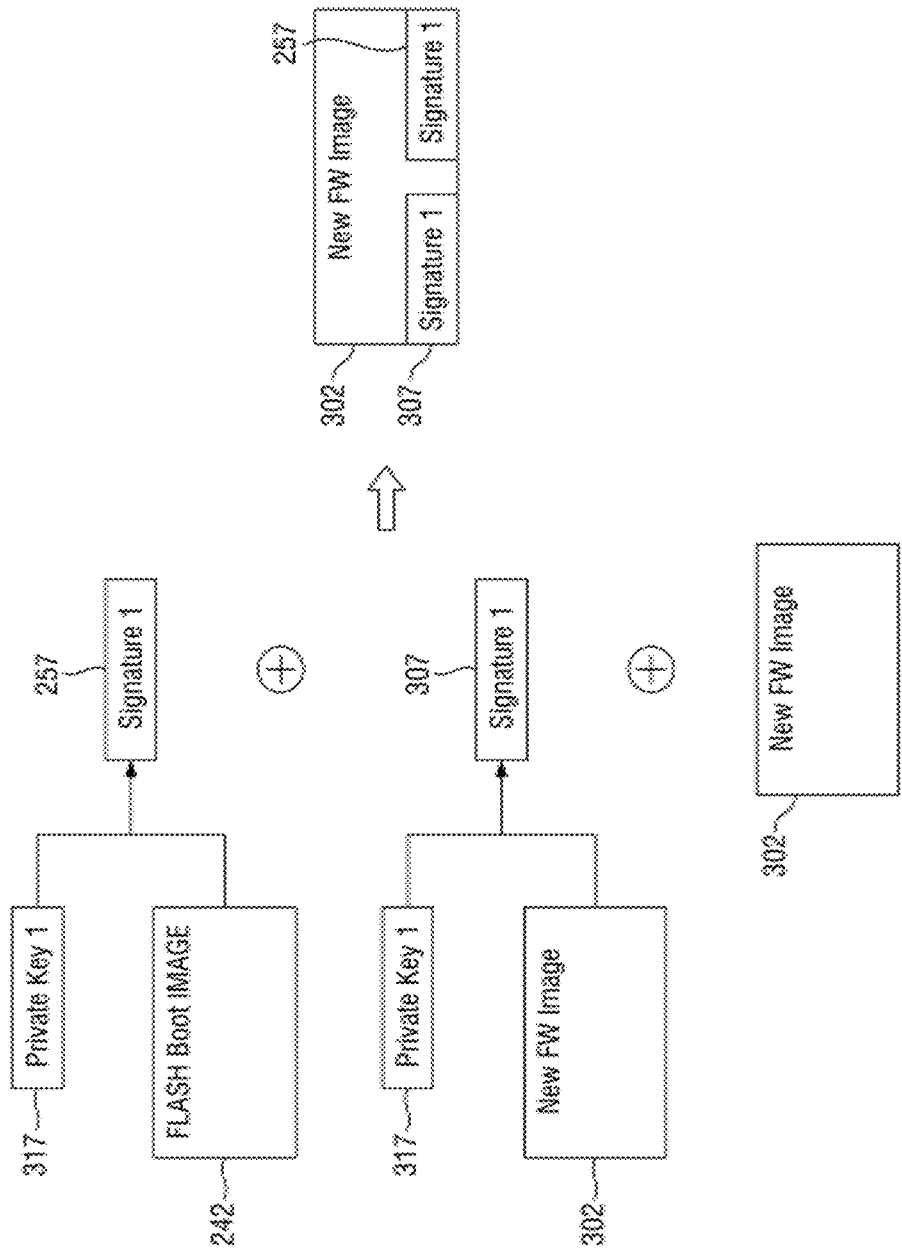
FIG. 7 is a block diagram for explaining a new firmware image of FIG. 5.
Figure 8:
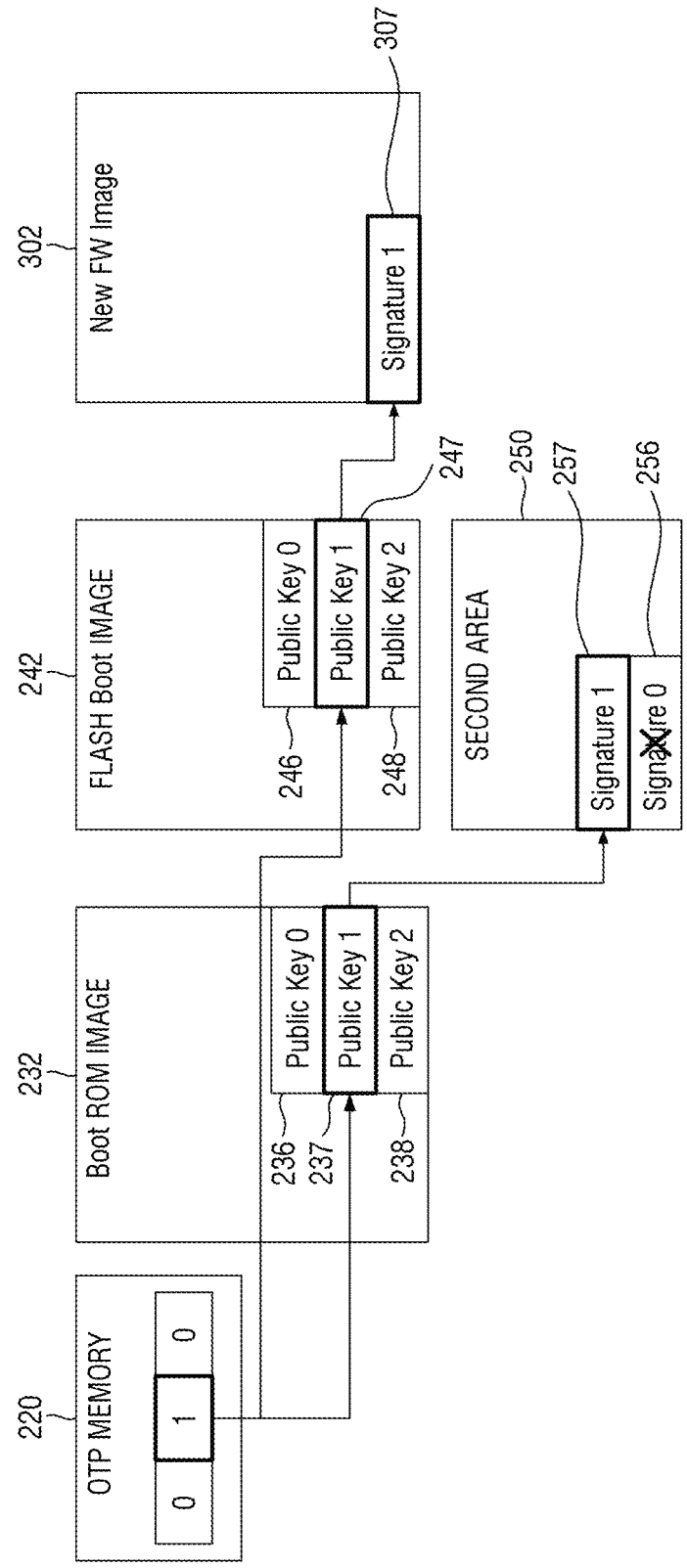
FIG. 8 is a block diagram for explaining an operation S70 of FIG. 5.
Figure 9:
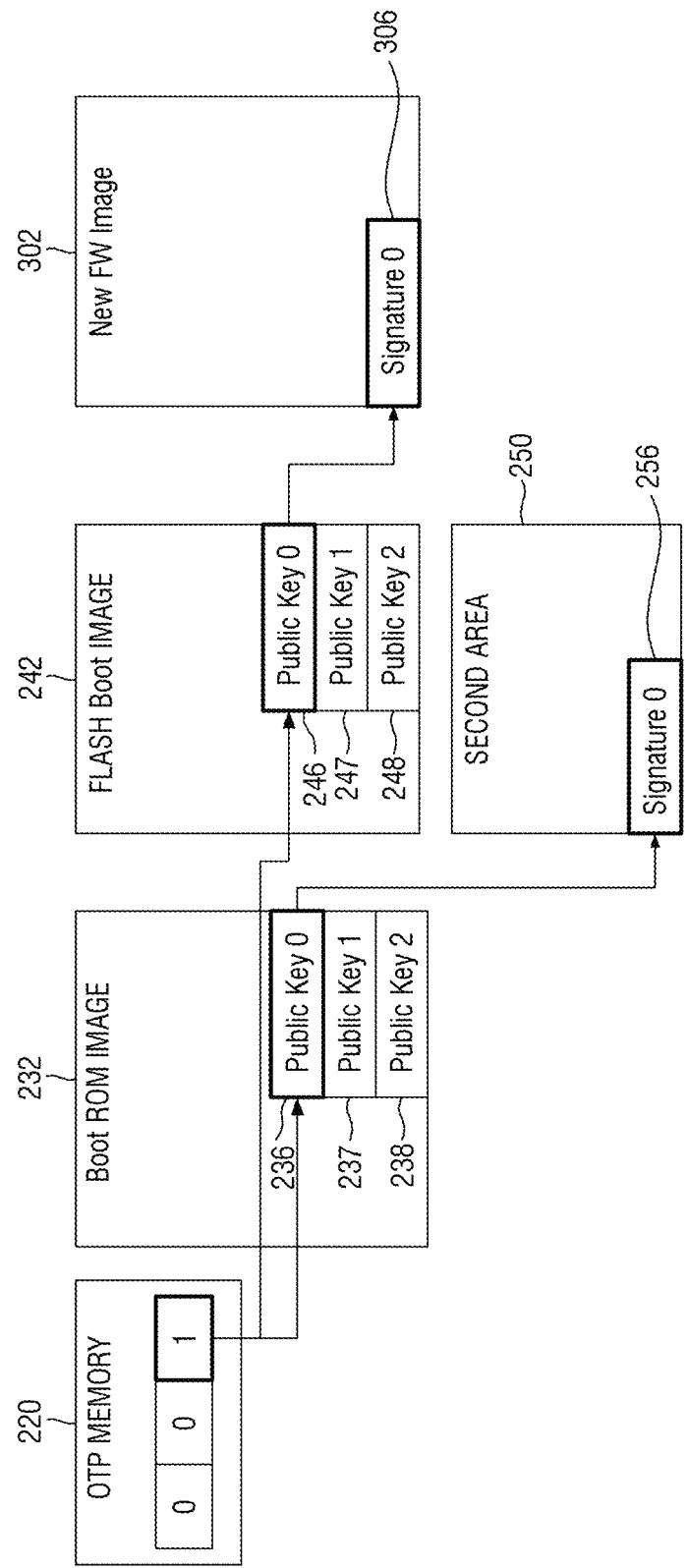
FIG. 9 is a block diagram for explaining an operation S72 of FIG. 5.

FIG. 5 is a flowchart for explaining an update method of the storage device according to an exemplary embodiment. FIG. 6 is a block diagram for explaining the update method of the storage device according to FIG. 5. FIG. 7 is a block diagram for explaining the new firmware image of FIG. 5. FIG. 8 is a block diagram for explaining an operation S70 of FIG. 5. FIG. 9 is a block diagram for explaining an operation S72 of FIG. 5.

Referring to FIGS. 5 and 6, the update method of the storage device according to an exemplary embodiment may be started while the firmware (215 of FIG. 4) is provided with a new second firmware image 302 (S10). For example, the firmware 215 may be provided with an update command including the second firmware image 302 from the outside.

The firmware 215 may write the second firmware image 302 in the firmware image area 290 of the second memory 270 in response to the reception of the second firmware image 302.

The firmware 215 may determine whether the first public keys 236 and 246 need to be revoked in response to the reception of the second firmware image 302 (S15). The firmware 215 may determine that the first public keys 236 and 246 need to be revoked based on the second firmware signature 307 included in the second firmware image 302. For example, when the private key used for the second firmware signature 307 is different from the private key used for the old first firmware signature 296, the firmware 215 may determine that the first public keys 236 and 246 need to be revoked.

The firmware 215 may read a new second boot signature 257 from the second firmware image 302, when it is determined that the first public keys 236 and 246 need to be revoked (S20).

For example, referring to FIG. 7, the second firmware image 302 provided to the firmware 215 may be in an encrypted state. The second firmware image 302 may include a second firmware signature 307 and a second boot signature 257. The second firmware signature 307 may be generated by a digital signature algorithm (DSA), using the second firmware image 302 and the second private key 317. The second boot signature 257 may be generated by the digital signature algorithm, using the flash boot image 242 and the second private key 317.

The digital signature algorithm may mean an algorithm that generates a signature on given data, using a private key that is known only by oneself. A third party may confirm that the data is generated from verified person through signature verification using the public key for verification.

Therefore, the second firmware image 302 may be verified to be generated by the manufacturer through the second firmware signature 307. As a result, the manufacturer certification and integrity of the second firmware image 302 may be ensured. Because the first firmware signature 296 was generated by the first private key and the second firmware signature 307 was generated by a second private key different from the first private key, the firmware 215 may determine that the first public keys 236 and 246 need to be revoked. Therefore, the firmware 215 may read the new second boot signature 257 from the second firmware image 302.

Referring to FIGS. 5 and 6 again, the firmware 215 may write the new second boot signature 257 in the second area 250 of the first memory (S30).

Subsequently, the firmware 215 may write data on the OTP memory 220 (S40). As a result, the OTP memory 220 may identify another public key, that is, the second public keys 237 and 247.

Due to the characteristics of the OTP memory 220, the OTP memory 220 may not identify the first public keys 236 and 246 again. That is, the first public key 236 stored in the boot ROM image 232 and the first public key 246 stored in the flash boot image 242 may not be reused and may be revoked. Therefore, the storage device according to an exemplary embodiment may prevent the public key from rolling back to the previous public key in the update process.

Next, the firmware 215 may delete the previous first boot signature 256 written in the second area 250 of the first memory (S50).

As a result, the firmware 215 may success update of the firmware (S60), and the storage device may be booted up for security, using the new second public keys 237 and 247 (S70).

That is, as explained earlier using FIG. 3, and referring to FIG. 8, when a power is applied to the storage device, the boot ROM image 232 may be copied to the memory controller 210. The memory controller 210 may be changed to the core of the boot ROM 230.

Next, the flash boot image 242 and the second boot signature 257 may be copied to the memory controller 210. The memory controller 210 may read the written data on the OTP memory 220.

The memory controller 210 may verify the second boot signature 257, using the second public key 237 in the boot ROM image 232 in accordance with the data of the read OTP memory 220. Because the second boot signature 257 was generated using the second public key 247 in the flash boot image 242, it may be verified by the second public key 237 in the boot ROM image 232. Accordingly, the flash boot image 242 may be executed, and the memory controller 210 may be changed to the core of the second memory 270.

Next, the second firmware image 302 may be copied to the memory controller 210. The memory controller 210 may read the data of the OTP memory 220.

The memory controller 210 may verify the second firmware signature 307, using the second public key 247 in the flash boot image 242 in accordance with the data written on the read OTP memory 220. Because the second firmware signature 307 was generated by the second private key corresponding to the second public keys 237 and 247, it may be verified by the second public key 247 in the flash boot image 242. Accordingly, the second firmware image 302 may be executed, and the memory controller 210 may be changed to the core of the firmware 215.

As a result, the storage device 200 may be booted up for security using the updated second firmware image 302.

On the other hand, if it is determined in operation S15 that the first public keys 236 and 246 do not need to be revoked, the firmware 215 writes the second firmware image 302 in the firmware image area 290, and then may success the firmware update (S62). For example, the firmware 215 may determine that the first public keys 236 and 246 do not need to be revoked, when the second firmware signature 307 and the first firmware signature 296 are generated by the same private key. That is, when the second firmware signature 306 is generated by the first private key, because the OTP memory 220 already identifies the first public 236 in the boot ROM image 232 corresponding to the first private key and the first public key 246 in the flash boot image 242, there is no need to change the data written on the OTP memory 220.

Also, because the first public key 236 in the boot ROM image 232 and the first public key 246 in the flash boot image 242 correspond to the first private key, there is no need to revoke the first public key 236 in the boot ROM image 232 and the first public key 246 in the flash boot image 242.

As a result, the firmware 215 may success the firmware update, and the storage device 200 may be booted up for security using the old first public keys 236 and 246 (S70). Referring to FIG. 9, the storage device 200 may be booted up for security, by executing the boot ROM image 232, verifying the first boot signature 256 by the use of the first public key 236 and executing the flash boot image 242, and verifying the second firmware signature 306 by the use of the first public key 246 and executing the second firmware image 302.

When the public key or the like used for secure booting is exposed in the storage device that supports secure booting, or there is a problem in the public key, a method for revoking the public key is required. In this case, a new firmware image including the firmware signature signed with the new private key needs to be provided to the storage device. A plurality of public keys may be stored in the boot ROM image and the flash boot image in the storage device when manufacturing the storage device. Therefore, when a new firmware image is provided, the storage device may revoke the old public key by the use of the public key corresponding to the firmware signature included in the new firmware image among a plurality of public keys, and may be booted up by the use of the new public key in accordance with new firmware.

In the case of a storage device booted up using the boot ROM and the first memory, a new flash boot image and a new firmware image are required to revoke the old public key and perform booting by the use of the new public key. However, since the first memory is a memory in which an access is restricted because of a storage of information on booting, it is not possible to provide a new flash boot image to the storage device after the release of the storage device. Also, it is difficult to inject the boot signatures of all public keys into the second area of the first memory when manufacturing the storage device. Therefore, the storage device booted up using the boot ROM and the first memory needs to be recovered and updated by the manufacturer.

In contrast, when the storage device 200 according to an exemplary embodiment is provided with a new firmware image 302 including the new boot signature 257, the new boot signature 257 may be written in the first memory 260 by the firmware 215. Also, the data written on the OTP memory 220 may be changed and the old public key in the first memory 260 may be revoked.

Therefore, the storage device 200 is provided with a new firmware image 302 without provision of a new flash boot image, revokes the old public keys 236 and 246, and may be updated with new public keys 237 and 247. That is, the storage device 200 may be updated only by providing the firmware image without changing the flash boot image. Alternatively, the manufacturer provides only the new firmware image 302, including the new boot signature 257 and the new firmware signature 307, and may provide update of the public key to the storage device 200. Also, the storage device 200 may be booted up according to the sequence of the old secure booting, without changing sequence of the secure booting.

Figure 10:
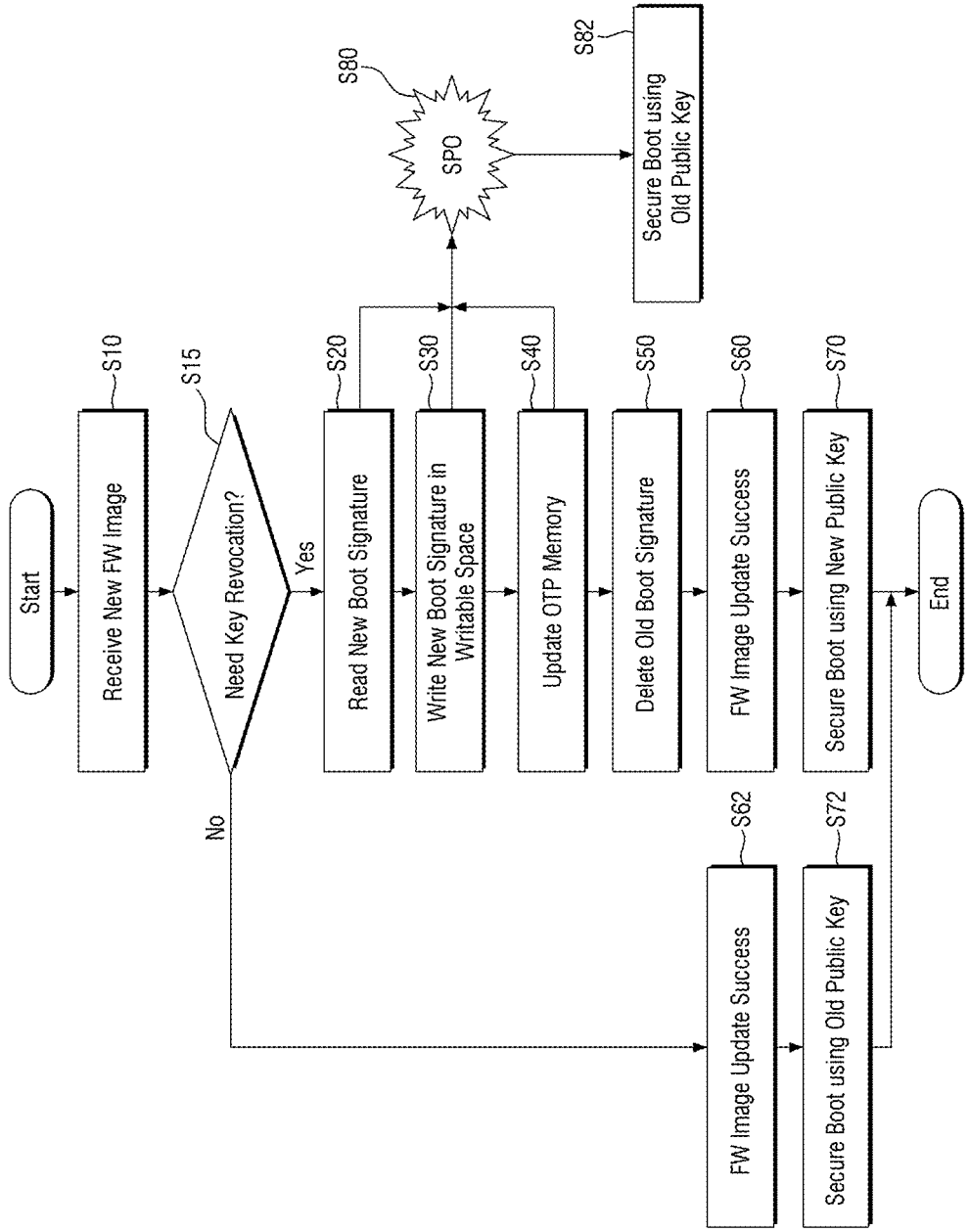
FIG. 10 is a flowchart for explaining an update method of the storage device according to an exemplary embodiment.

FIG. 10 is a flowchart for explaining an update method of the storage device according to an exemplary embodiment. FIGS. 11 to 14 are block diagrams for explaining an operation S82 of FIG. 10. Differences from those explained using FIGS. 4 to 9 will be mainly explained.

Referring to FIG. 10, the update method of the storage device according to an exemplary embodiment may be started while the firmware 215 is provided with a new second firmware image 302. The storage device may be updated by operations S20 to S70 as explained above.

However, a sudden power-off (SPO) in which a power is suddenly turned off during operations S15 to S40 may occur (S80).

At this time, the storage device may security-boot up the previous first public key (S82).

Figure 11:
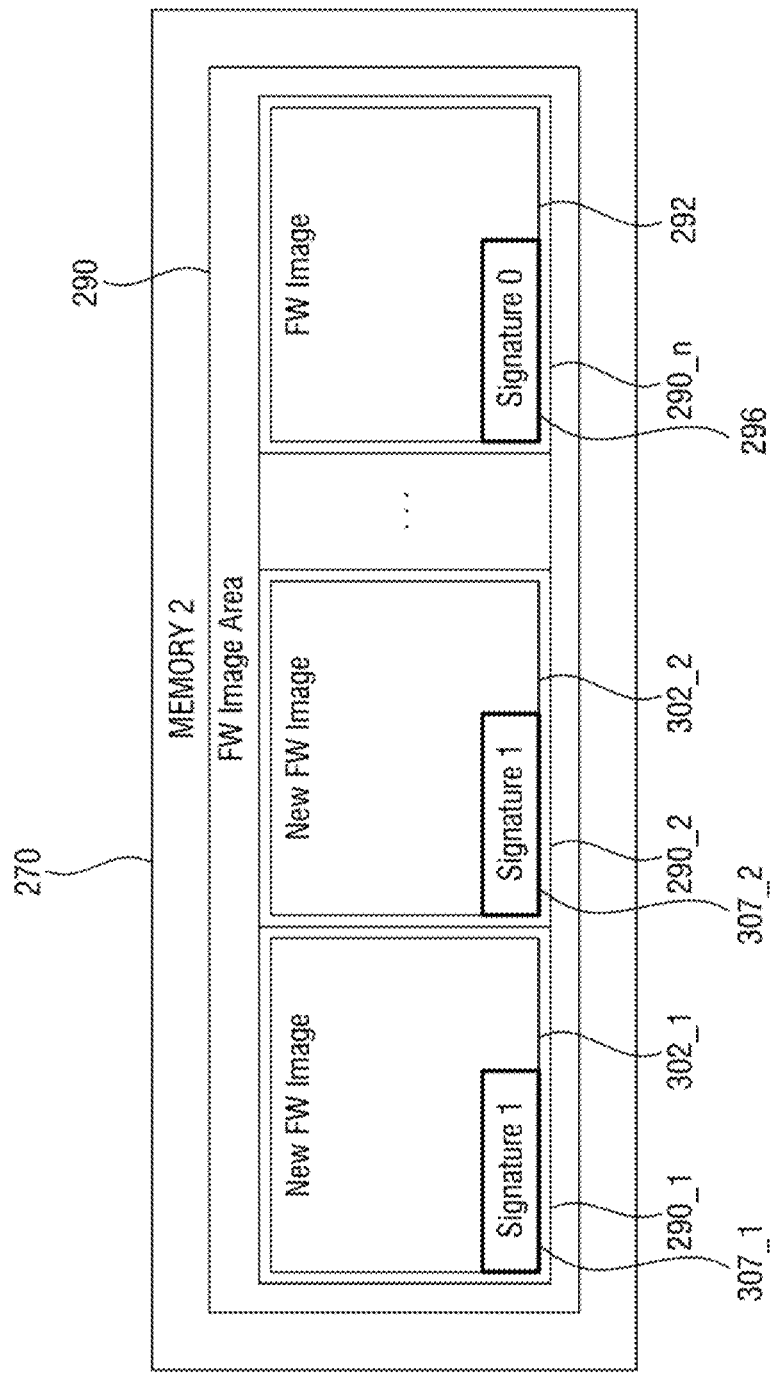
FIG. 11 is a block diagram for explaining an operation S82 of FIG. 10.

For example, referring to FIGS. 5, 6 and 11, a sudden power-off may occur while the firmware receives second firmware images 302_1 and 302_2 to write the second firmware images 302_1 and 302_2 in the firmware image area 290 of the second memory 270. Writing of the second firmware images 302_1 and 302_2 in the firmware image area 290 of the second memory 270 may be performed, for example, alternately with writing of the new second boot signature 257 in the second area 250 of the first memory (operation S30). That is, after the second firmware images 302_1 and 302_2 are written in at least a part of the firmware image area 290 of the second memory 270, the operation S30 may be performed. According to another example embodiment, after all the second firmware images 302_1 and 302_2 are written on the firmware image area 290 of the second memory 270, the operation S30 may be performed.

The firmware image area 290 may include a plurality of firmware image storage areas 290_1 to 290_n. Each of the firmware images 302_1, 302_2 and 292 may be stored in each of the firmware image storage areas 290_1 to 290_n. The second firmware images 302_1 and 302_2 may be stored in some of the plurality of firmware image storage area 290_1 to 290_n, and the first firmware image 292 may be stored in the remaining area.

In this case, because the data stored in the OTP memory has not changed yet, the storage device may be booted up for security, by verifying the first boot signature 256 by the use of the first public key 236 to execute the flash boot image 242, and by verifying the first firmware signature 296 by the use of the first public key 246 to execute the first firmware image 292.

The storage device may be updated by operations S10 to S70 when a new firmware image is provided again after the secure booting.

Figure 12:
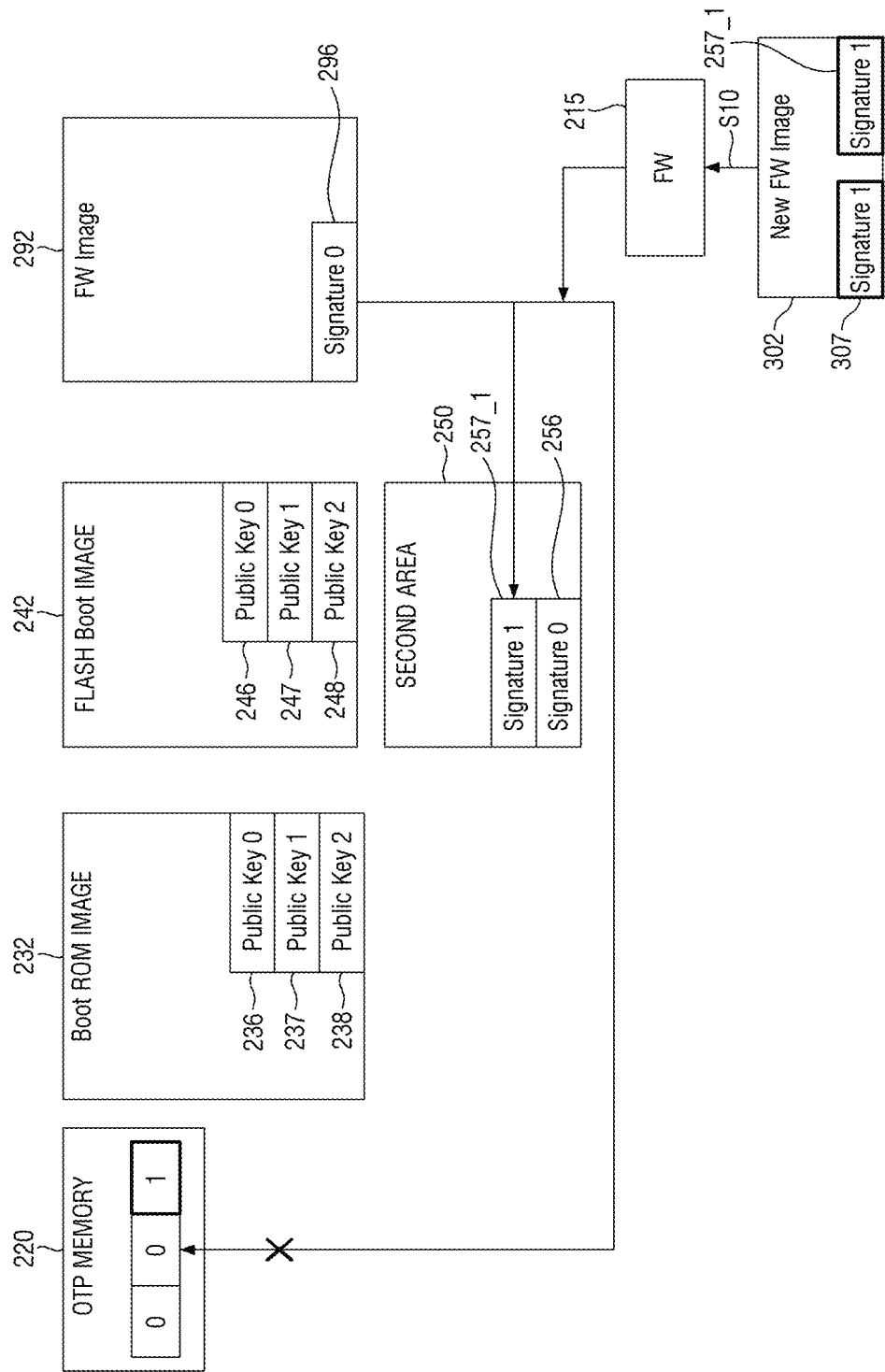
FIG. 12 is a block diagram for explaining the operation S82 of FIG. 10.
Figure 13:
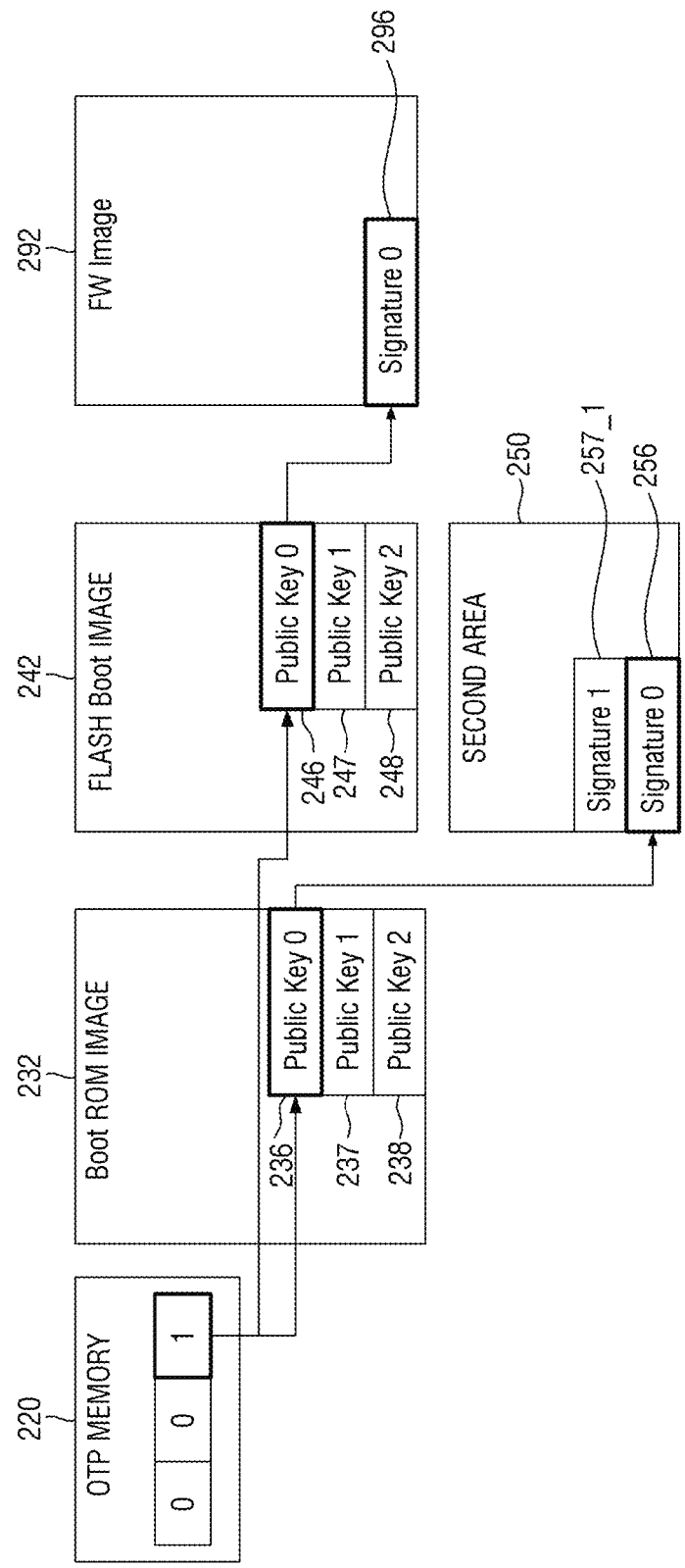
FIG. 13 is a block diagram for explaining the operation S82 of FIG. 10.

In still another example, referring to FIG. 12, a sudden power-off may occur while the new second boot signature 257_1 is being written in the second area 250 of the first memory or after the second boot signature 257_1 is written in the second area 250 of the second memory.

According to an example embodiment, the case illustrated in FIG. 12 may be before a part of the second boot signature 257_1 is written on the second area 250 but the data written on the OTP memory 220 is changed. Accordingly, referring to FIG. 13, the storage device may be booted up for security, using the boot ROM image 232, the flash boot image 242 verified by the first public key 236 and the first boot signature 256 according to the data written on the OTP memory 220, and the first firmware image 262 verified by the first public key 246 and the first firmware signature 296 according to the data written on the OTP memory 220.

The storage device may be updated by operations S10 to S70 when a new firmware image is provided again after secure booting.

After a new second boot signature 257_1 is written in the second area 250 of the second memory, the data is written on the OTP memory 220, after that, the old first boot signature 256 is deleted, and update of the storage device according to an exemplary embodiment may be completed. As a result, even if a sudden power-off occurs during the update process, the storage device may be booted up for security by the use of the first public keys 236 and 246 before the update. Also, the storage device may be booted up for security according to the sequence of the old secure booting.

Figure 14:
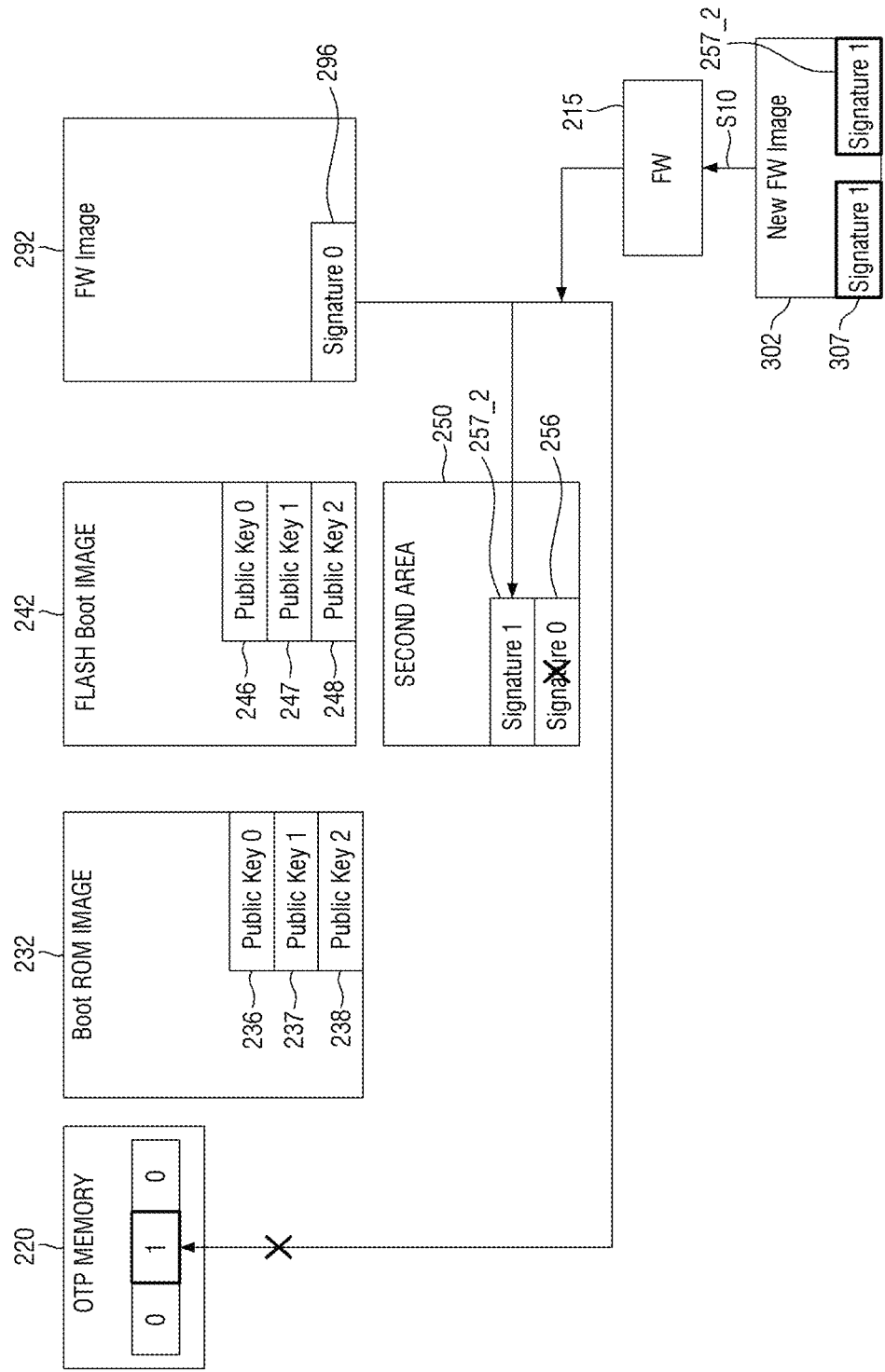
FIG. 14 is a block diagram for explaining the operation S82 of FIG. 10.

FIG. 14 is a block diagram for explaining a case where the operation S10 is performed after operation S82 in FIG. 10.

Referring to FIG. 14, the storage device may be provided with a new second firmware image 302 again after the firmware update fails due to a sudden power-off during the update. The new second firmware image 302 may be a firmware image generated by the same private key as the firmware image provided in the firmware update that failed due to the sudden power-off. The firmware 215 may read a new second boot signature 257_2 from the new second firmware image 302. In this case, because the old written second boot signature 257_1 and the new second boot signature 257_2 were generated by the same private key, the new second boot signature 257_2 needs to be written at an address in which the old second boot signature 257_1 is written in the second area 250. Therefore, the firmware 215 deletes the old second boot signature 257_1 and may write the second boot signature 257_2 from the new second firmware image 302 at the address from which the old second boot signature 257_1 is deleted.

In still another example, the new firmware image 302 may be provided with another firmware image generated by a private key different from the firmware image provided by the firmware update that failed due to the sudden power-off. In this case, the firmware 215 reads the new boot signature from the other firmware images provided, and may write a new boot signature at the address in the second area 250 corresponding to the address at which the public key is stored in the first area 240.

Therefore, even if there is a boot signature written by the failed firmware update in the second area 250, no problem may occur in the update and booting of the storage device.

Figure 15:
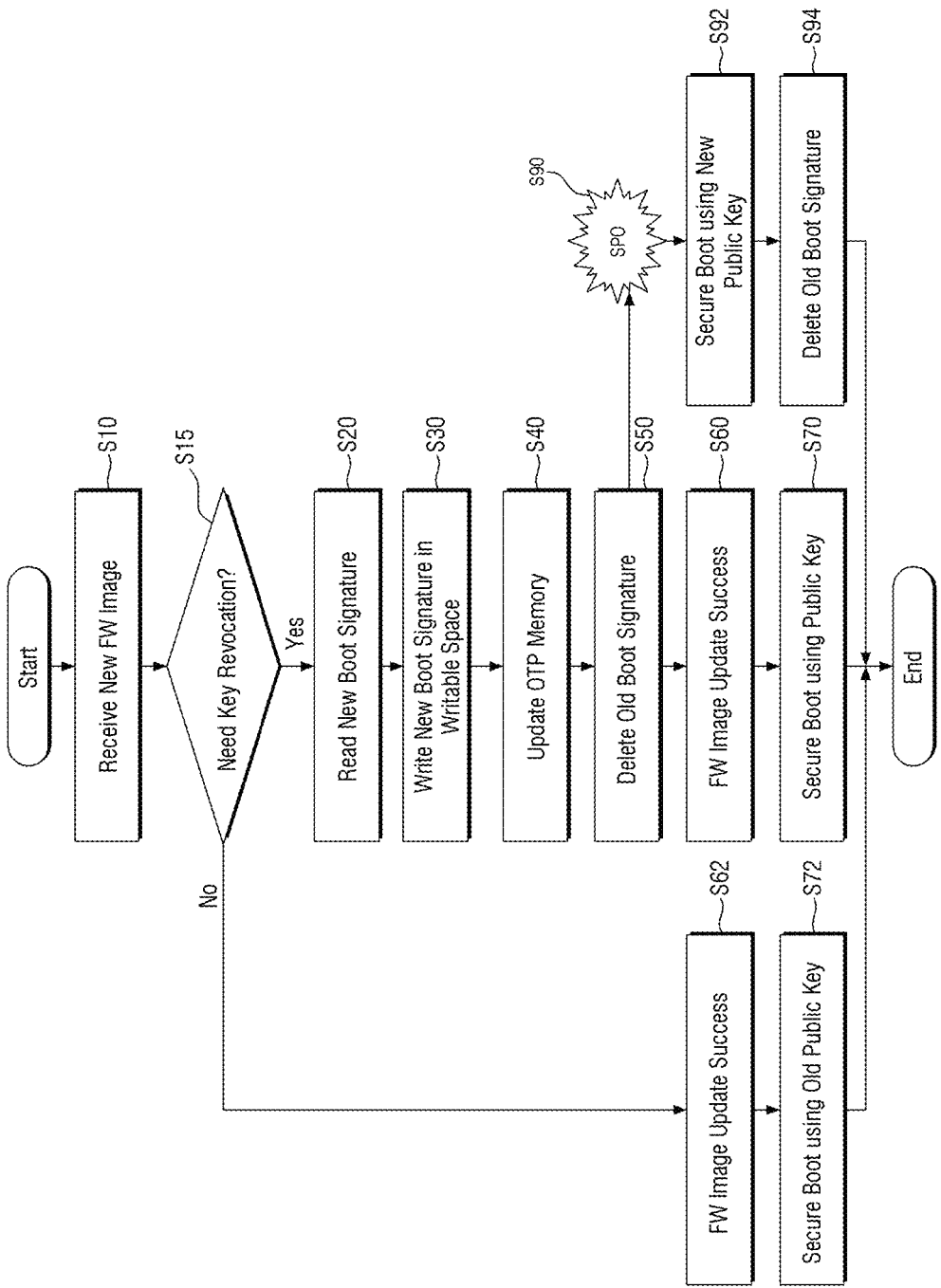
FIG. 15 is a flowchart for explaining an update method of the storage device according to an exemplary embodiment.
Figure 16:
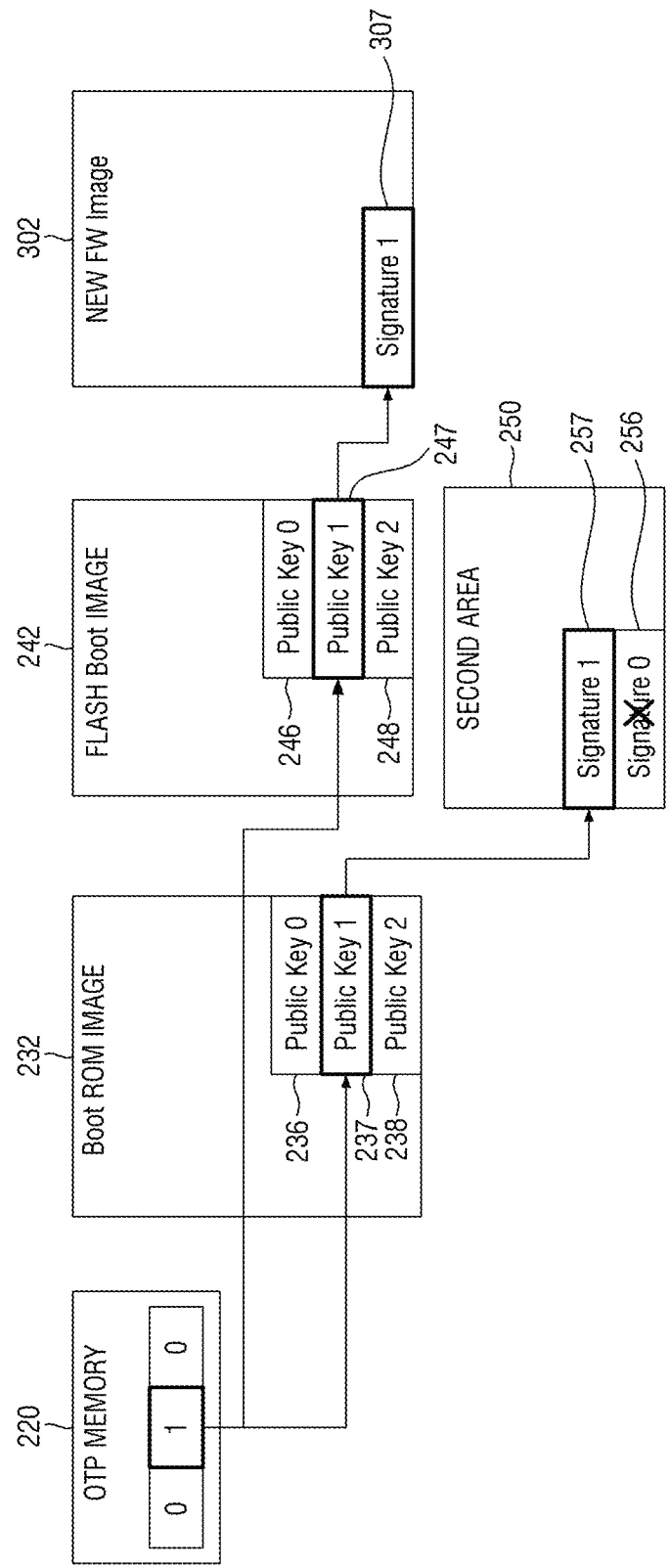
FIG. 16 is a block diagram for explaining operations S92 and S94 of FIG. 15.

FIG. 15 is a flowchart for explaining an update method of the storage device according to an exemplary embodiment. FIG. 16 is a block diagram for explaining operations S92 and S94 of FIG. 15. Differences from those explained using FIGS. 4 to 9 will be mainly explained.

Referring to FIGS. 15 and 16, a sudden power-off may occur even at an operation S50 of the update method of the storage device according to an exemplary embodiment (S90).

At this time, because the OTP memory 220 was written to identify the second public keys 237 and 247, even when the first boot signature 256 was not deleted, the storage device may be booted up using the second public keys 237 and 247 (S92).

The storage device verifies the second boot signature 257 using the second public key 237, and the flash boot image 242 may be executed accordingly. Also, the storage device verifies the second firmware signature 307 using the second public key 247, and the first firmware image 262 may be executed and booted up for security.

Subsequently, when both the first boot signature 256 and the second boot signature 257 are written on the second area 250 of the first memory, the firmware may delete the first boot signature 256 (S94). That is, when the OTP memory 220 is written to identify the second public keys 237 and 247, and the old first public keys 236 and 246 are revoked, the firmware may delete the old first boot signature 256 existing in the second area 250 of the first memory.

In the detailed description, those skilled in the art will appreciate that many variations and modifications may be made to the exemplary embodiments without substantially departing from the principles of the disclosure. Therefore, the disclosed exemplary embodiments of the disclosure are used in a generic and descriptive sense only and not for purposes of limitation.

What is claimed is:
1. A storage device comprising:
a boot Read Only Memory (ROM) configured to store a plurality of public keys and a boot ROM image;
an One-Time Programmable Memory (OTP) memory configured to identify a first public key among the plurality of public keys;
a first memory including a first area configured to store the plurality of public keys and a flash boot image different from the boot ROM image, and a second area configured to store a first boot signature corresponding to the flash boot image;

a second memory including a user data area, and a firmware image area configured to store a first firmware image including a first firmware signature; and
a memory controller configured to:
receive a second firmware image including a second firmware signature different from the first firmware signature and a second boot signature different from the first boot signature,
receive a second public key among the plurality of public keys and the flash boot image from the first area of the first memory based on the second firmware image being received, and
write the second boot signature in the second area of the first memory.

2. The storage device of claim 1, wherein the first area of the first memory is only readable by the memory controller, and the second area of the first memory is readable and writable by the memory controller.

3. The storage device of claim 2, wherein the memory controller is further configured to perform the write operation in the second area of the first memory in response to receiving the second firmware image.

4. The storage device of claim 1, wherein the first firmware signature is generated based on a first private key corresponding to the first public key,
the second firmware signature is generated based on a second private key corresponding to the second public key, and
the first private key and the second private key are same.

5. The storage device of claim 4, wherein
the first boot signature written at a first address of the first memory is deleted, and the second boot signature is written at the first address.

6. The storage device of claim 1, wherein the first firmware signature is generated based on a first private key corresponding to the first public key,
the second firmware signature is generated based on a second private key corresponding to the second public key different from the first private key, and
the second boot signature is generated based on the flash boot image and the second private key.

7. The storage device of claim 6, wherein the first boot signature is written at a first address in the second area of the first memory, and
the second boot signature is written at a second address different from the first address, in the second area of the first memory.

8. The storage device of claim 1, wherein an address in which the second boot signature is stored in the second memory corresponds to an address in which the second public key is stored in the boot ROM.

9. The storage device of claim 1,
wherein the second boot signature is generated based on a second private key different from a first private key corresponding to the first public key.

10. The storage device of claim 1, wherein addresses of each of the plurality of public keys stored in the boot ROM image corresponds to addresses of each of the plurality of public keys stored in the first memory.

11. The storage device of claim 1, wherein the memory controller is further configured to write data on the OTP memory so that the OTP memory identifies the second public key among the plurality of public keys.

12. The storage device of claim 11, wherein the memory controller is further configured to delete the first boot signature from the second area of the first memory.

13. A storage device comprising:
a boot Read Only Memory (ROM) configured to store a plurality of public keys and a boot ROM image;
an One Time Programmable (OTP) memory configured to identify a first public key among the plurality of public keys;
a first memory including a first area configured to store the plurality of public keys and a flash boot image different from the boot ROM image, and a second area configured to store a first boot signature corresponding to the flash boot image, the second area being different from the first area;
a second memory including a user data area, and a firmware image area configured to store a first firmware image including a first firmware signature; and
a memory controller configured to:
receive a second firmware image including a second firmware signature different from the first firmware signature, and
write the second firmware image in the firmware image area based on the second firmware image being received,
wherein the first area of the first memory is only readable by the memory controller, and the second area of the first memory is readable and writable by the memory controller.

14. The storage device of claim 13, wherein the first firmware signature is generated based on a first private key corresponding to the first public key, and
the second firmware signature is generated based on the first private key.

15. The storage device of claim 13, wherein the first firmware signature is generated based on a first private key corresponding to the first public key,
the second firmware signature is generated based on a second private key different from the first private key, and
the memory controller is further configured to write a second boot signature different from the first boot signature in the second area of the first memory based on the second firmware image being received.

16. The storage device of claim 15, wherein the memory controller is further configured to read a second public key corresponding to the second private key among the plurality of public keys from the first area of the first memory, based on the second firmware image being received.

17. The storage device of claim 13, wherein the memory controller is further configured to verify the first firmware image using the first public key, when a power-off occurs while the second firmware image is being written in the second area.

18. A storage device comprising:
a boot Read Only Memory (ROM) which stores a plurality of public keys and a boot ROM image;
an One-Time Programmable Memory (OTP) memory configured to identify a first public key among the plurality of public keys;
a first memory including a first area configured to store the plurality of public keys and a flash boot image different from the boot ROM image, and a second area configured to store a first boot signature corresponding to the flash boot image and different from the first area;
a second memory including a user data area, and a firmware image area configured to store a first firmware image including a first firmware signature generated based on a first private key corresponding to the first public key; and a memory controller configured to:
receive a second firmware image including a second firmware signature different from the first firmware signature, and a second boot signature different from the first boot signature,
write the second boot signature in the second area of the first memory based on the second firmware image being received, and
write data in the OTP memory so that the OTP memory identifies a second public key different from the first public key among the plurality of public keys and delete the first boot signature stored in the second area of the first memory,
wherein the second firmware signature is generated based on a second private key corresponding to the second public key and the second firmware image.

19. The storage device of claim 18, wherein the memory controller is configured to verify the second firmware image using the second public key when a power-off occurs, after writing the data in the OTP memory and before deleting the first boot signature stored in the second area of the first memory.

* * * * *